Patented July 9, 1946

2,403,792

UNITED STATES PATENT OFFICE 2,403,792

DI-PHOSPHORUS ESTERS AND PROCESS OF MANUFACTURING

Ernest F. Engelke, Merchantville, N. J., assignor to Cities Service Oil Company, New York, N. Y., a corporation of Pennsylvania No Drawing. Application March 28, 1942, Serial No. 436,623

6 Claims. (Cl. 260—461)

This invention relates to improved organic diphosphorus esters and to the process for their manufacture. More particularly, the invention relates to the manufacture of extreme pressure lubricants containing organic di-phosphorus esters.

Many types of extreme pressure agents have been used in lubricating oils and greases and in most cases such agents are relatively unstable and contain constituents which may react with the metal surfaces and induce excessive sludge formation. Reactions of this type materially change the lubricant and gradually deplete its effective constituents.

The primary object of the present invention is to provide an improved extreme pressure lubricating agent which is relatively stable and which is especially effective in the lubrication of hypoid gears and other mechanisms in which high pressures are involved.

Another object of the invention is to provide improved organic di-phosphorus esters suitable for use as film strength agents.

A further object of the invention is to provide an improved process for the manufacture of di-phosphorus organic esters.

In accordance with the features of the present invention the improved di-phosphorus organic esters may be made from the ordinary mono or di-organic phosphites, phosphates, or thiophosphates, more particularly the acid halides such as the monochlorides. In general, the improved process includes the steps of reacting the organic phosphorus acid chloride with metallic sodium or its equivalent, at temperatures of from about 150° to about 225° F., the temperature being adapted to effect elimination of the chlorine as sodium chloride and the direct combination of two molecules of the acid chloride by a phosphorus-phosphorus linkage.

The organic phosphorus esters used as starting materials are preferably the mono- or dichlorides of phosphorous acids, phosphoric acids, and thiophosphoric acids, while the final products may be represented by the general formula:

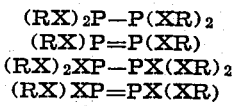

The compounds, in which the phosphorus is linked to phosphorus with a double linkage, are made from the dichlorides such for example as (RX)PCl$_2$. In the above general formula, X stands for oxygen or sulfur, and the (RX) groups represent ester groups directly attached to phosphorus through X. In the above formula R represents aliphatic, aromatic, or aralkyl radicals, either of which may be halogenated.

The method of manufacturing the improved organic diphosphorus esters together with their effectiveness as film strength agents or extreme pressure lubricants, may be illustrated by reference to the following specific examples in which the quantities of materials are given in parts by weight.

*Example 1*

A tetra-cresyl di-phosphorus ester was prepared from di-paracresyl phosphorus acid monochloride, (CH$_3$.C$_6$H$_4$.O)$_2$PCl, by dissolving approximately 56 parts of the latter in about 100 parts of xylol and heating the resulting solution in a reaction vessel equipped with a reflux condenser. The heating was carried out by the use of an oil bath and the temperature gradually raised to 200° F., at which time five parts of metallic sodium was added to the solution in small portions at a time. The reaction was rather violent and sodium chloride crystals were deposited on the sides and bottom of the reaction vessel. When the reaction was complete, the heating was continued for about one-half hour, and the reaction mass then cooled and filtered to remove the sodium chloride. The filter cake was washed with hot xylol and added to the filtrate which was washed with water until neutral, and then subjected to distillation for the removal of the xylol. The final stage of the distillation was conducted at a reduced pressure in order to insure substantially complete removal of the xylol.

The resulting di-phosphorus ester was a straw yellow-colored oily liquid at room temperature. Its effectiveness as a film strength agent was tested on the Timken testing machine using blends of 30 SAE Pennsylvania lubricating oil containing 0.5%, 1.0% and 1.5% of the agent. These blends showed load-carrying capacities respectively of 27,000, 30,800 and 32,000 lbs. per square inch, while the lubricating oil alone carried only 15,750 lbs. per square inch. The use of the above-mentioned film strength agent in the lubricating oil increased its pour point by about 5° F. and increased the viscosity index but made very little change in the viscosity of the oil.

*Example 2*

A phenol thiophosphate,

was prepared by reacting 62.5 parts of

dissolved in xylol, with sodium, 25% in excess of that theoretically required to remove the chlorine. The reaction was carried out substantially in the manner described in Example 1, but the temperature rose to 240° to 250° F. after a portion of the sodium had been added.

The final reaction mixture was cooled to room temperature, filtered to remove the sodium chloride, and then washed with water until neutral. The resulting washed filtrate was dried and then distilled to remove the xylol. Portions of the finished product were blended with 20 SAE Pennsylvania lubricating oil to make blends containing 0.5%, 1.0% and 1.5%. These blends when tested on the Timken testing machine showed load-carrying capacities of 27,900; 32,000 and 29,800 lbs. per square inch; whereas the oil alone had a load-carrying capacity of only 12,380 lbs. per square inch.

*Example 3*

A mixture of di-phosphorus esters containing single and double linkages

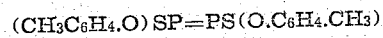

and

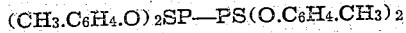

was prepared by reacting 130 parts of a mixture of thiophosphoric acid cresyl ester mono and di-chlorides with metallic sodium, 10% in excess of that theoretically required to remove the chlorine from the chlorides. The initial mixture was dissolved in xylol and reacted with the sodium under the conditions described in Example No. 2. After the product was recovered and washed as in Example 2, portions of it were blended with 20 SAE Pennsylvania lubricating oil to produce blends containing 0.5%, 1.0% and 1.5% of the mixture. These blends showed load-carrying capacities respectively, of 19,350; 25,800; and 24,300, while the Pennsylvania lubricating oil alone had a load-carrying capacity of only 12,350.

While in the foregoing examples sodium was used to effect the P—P linkage, it is believed that lithium, potassium and finely divided silver, copper and zinc may be employed at least in certain reactions, as is true in the Wurtz-Fittig synthesis. Organic phosphorus chlorides were used in the operations described in the examples primarily for economic reasons, but it is possible to use other organic phosphorus halogen compounds especially the iodides and bromides. While it is believed that the reactions described in connection with the foregoing examples proceed mainly to produce the products indicated, it is possible that minor proportions of other materials are formed, as for example, a compound in which two phosphorus atoms are linked to a third may be produced where mixtures of mono- and di-chlorides are used as starting materials.

The examples are given above for the purpose of illustrating the invention, and it is to be understood that R in the general formula may represent an aromatic or aliphatic radical or compound and that either of these may be halogenated or contain other elements such as oxygen or sulfur. Where the ester chloride starting materials contain aliphatic radicals as R the hydrocarbon chain may be straight or branched. Where two (RX) groups are attached to a single phosporus one R may be aliphatic and the other aromatic. The di-phosphorus esters, in which phosphorus has a valence of 5, may be produced by oxidizing or sulfurizing the di-phosphorus esters in which phosphorus has a valence of 3. Such compounds of course may be produced, as shown in the examples, by starting with the ester halide in which phosphorus has a valence of 5, as for example $(RO)_2PXCl$ or $(RO)PXCl_2$ where X is oxygen or sulfur directly attached to phosphorus with a double bond.

It is to be understood that while the invention has been described and illustrated in connection with the use of the improved compounds as extreme pressure agents in lubricating oils, such compounds are suitable for other purposes as for example in the making of cutting oils, greases, and for blending with fatty oils, synthetic oils and esters, to produce various types of lubricants. It is to be further understood that the improved compounds may be used directly as lubricants.

Certain subject-matter originally claimed in this application is now claimed in divisional application Serial No. 469,125, filed December 15, 1942.

Having thus described the invention in its preferred form, what is claimed as new is:

1. The process of manufacturing organic di-phosphorus esters comprising the steps of reacting an organic phosphorus ester chloride in which a hydrocarbon-oxy group and a chlorine atom are linked to a phosphorus atom with a metal adapted to effect a Wurtz-Fittig reaction at a temperature of from 150° to 225° F., separating the resulting organic di-phosphorus ester from the metal chloride formed in the reaction, and recovering the organic di-phosphorus ester.

2. The process of manufacturing organic di-phosphorus esters in which a phosphorus atom is directly linked to a phosphorus atom, which comprises dissolving an organic phosphorus halide ester in which a hydrocarbon-oxy group and a halogen atom are linked to a phosphorus atom in an inert solvent, heating the resulting solution to a temperature of approximately 200° F., slowly adding metallic sodium to the heated mixture until an excess has been added for the removal of halogen from said ester, removing the resulting sodium halide, neutralizing the remaining reaction mixture, removing the solvent, and recovering the di-phosphorus organic ester.

3. The process of making di-phosphorus esters, which comprises reacting an organic phosphorus ester chloride in which a hydrocarbon-oxy group and a chlorine atom are linked to a phosphorus atom at a temperature of about 200° F. with metallic sodium to thereby effect the removal of the chlorine from the ester and join the phosphorus atom of one ester molecule with that of another ester molecule to produce di-phosphorus esters having an organo-oxy group attached to each phosphorus atom, and separating the resulting di-phosphorus ester from the resulting sodium chloride.

4. The process of making a di-phosphorus cresyl ester, which comprises reacting a cresyl ester of phosphorus containing a chlorine atom attached to the phosphorus atom of the ester with metallic sodium at a temperature of about 200° F., thereby effecting the removal of chlorine and the production of a di-phosphorus ester in which a phosphorus atom is directly linked to a phosphorus atom and in which a cresyl group is linked to each phosphorus atom, and separating the resulting di-phosphorus ester from the sodium chloride produced in the reaction.

5. A di-phosphorus ester having the formula $(RO)_2P—P(OR)_2$ in which R is a radical selected from the group consisting of alkyl, aryl and alkaryl radicals.

6. A tetra-cresyl di-phosphorus ester having the formula: $(CH_3.C_6H_4.O)_2P—P(O.C_6H_4.CH_3)_2$.

ERNEST F. ENGELKE.